United States Patent Office 3,547,827
Patented Dec. 15, 1970

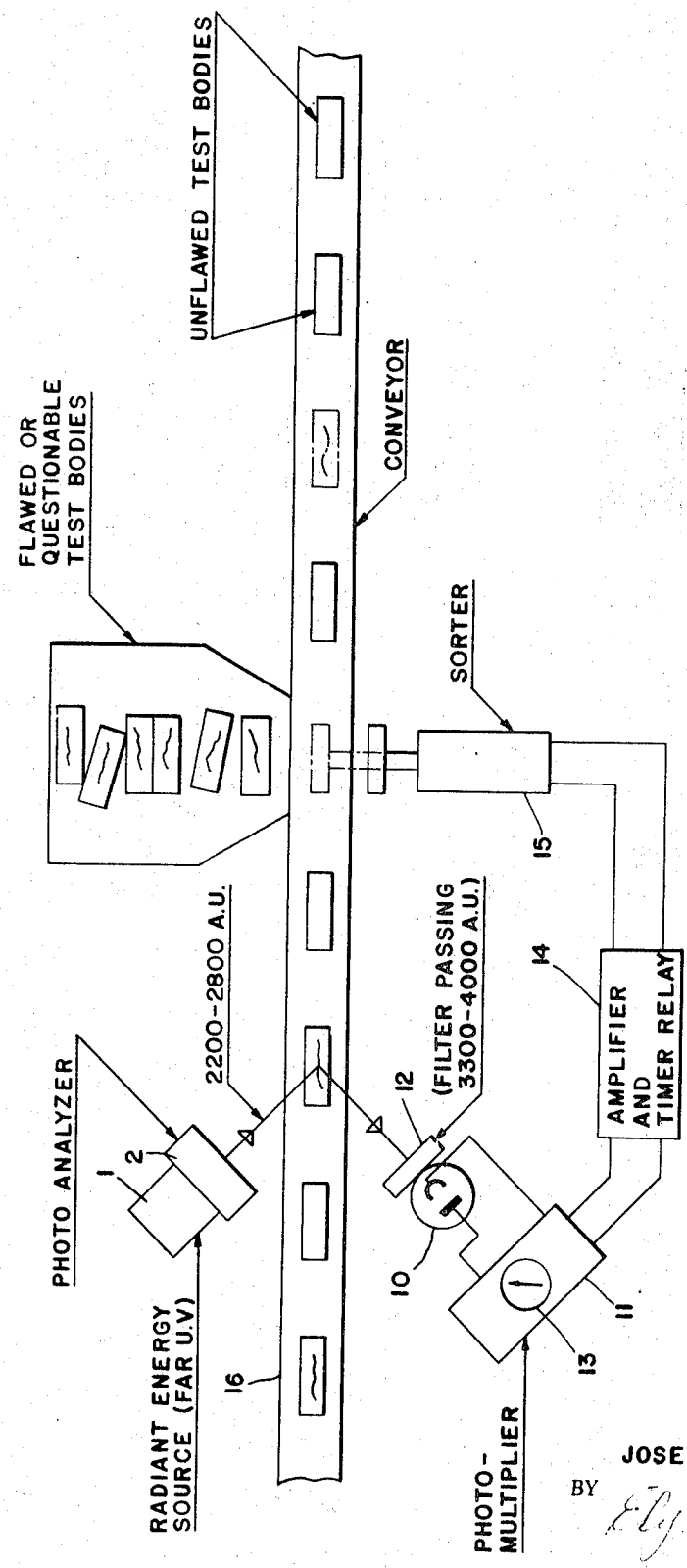

3,547,827
COMPOSITIONS FOR NON-VISIBLE PENETRANT METHODS OF FLAW DETECTION
Joseph L. Switzer, Gates Mills, Ohio, assignor to Day-Glo Color Corp., Cleveland, Ohio, a corporation of Ohio
Original application Oct. 12, 1961, Ser. No. 144,673, now Patent No. 3,341,010, dated Sept. 12, 1967. Divided and this application July 21, 1967, Ser. No. 655,090
Int. Cl. C09k 1/02; F21k 2/00
U.S. Cl. 252—301.2
3 Claims

ABSTRACT OF THE DISCLOSURE

Compositions permitting scanning by non-visible incident radiation and emissions, of parts for surface flaws revealed by penetrant at or in flaw openings; composition comprises a dry mixture of scintillating powder and carrier powder substantially non-adherent to test part except when penetrant is in or at a flaw opening and carrier powder promotes adherence of the scintillating mixture in order to locate flaw when part is scanned.

This is a division of the application of Joseph L. Switzer for "Non-Visible Methods of Flaw Detection and Apparatus Therefor," Ser. No. 144,673, filed Oct. 12, 1961, now U.S. Pat. No. 3,341,010, which is a continuation-in-part of the application of Joseph L. Switzer for "Non-Visible Methods of Flaw Detection and Apparatus and Compositions therefor," Ser. No. 53,036, filed Aug. 31, 1960 which is now abandoned.

This invention relates to improvements in methods of non-destructive testing of parts, materials, and structures (hereafter also referred to as "test bodies") and, more particularly, to penetrant methods of non-destructive testing employing a tracer in the testing materials, said tracer being excited by radiant energy in the Hertzian spectrum so as to emit radiant energy at a lower energy level than the exciting energy, whereby said emission indicates the location, extent, and/or nature of flaws in the test body. The invention also relates to materials and apparatus for carrying out these improved flaw detection methods.

The first commercially successful and now widely used methods of employing materials for flaw detection provided with the above-mentioned tracers involving excitation and emission (at a lower energy level) of radiant energy in the Hertzian spectrum were disclosed in the patents of Robert C. Switzer, U.S. Pat. No. 2,259,400 (relating to fluorescent penetrant methods for detecting flaws having surface openings) and U.S. Pat. No. 2,267,999 (relating to fluorescent magnetic particle methods of detecting flaws in paramagnetic bodies). In the fluorescent penetrant method, a fluorescent penetrant liquid is applied to the surface of a test body to penetrate in the surface openings of sub-surface flaws; the penetrant is removed from the unflawed surface area and, then, after exudation of the penetrant retained in the sub-surface flaws and openings has occurred, the test body is inspected under filtered ultra-violet ("black light"). In the fluorescent magnetic powder method, a magnetic flux is passed through or generated in the test body and fluorescent magnetic powders are distributed over the body; where the body is flawed by surface and sub-surface flaws, such as voids, discontinuities, or occlusions of less magnetic permeability than the material of the body being tested, the increased magnetic flux at the surface of the test bodies tends to concentrate the fluorescent magnetic powders in the location of such flaws. The test body is then inspected under fluorescigenous energy (black light, almost without exception in present commercial practice). In both cases the emission of visible light by the fluorescent testing medium reveals to the eye of an operator the location of the flaws by contrast with the absence of such visible emission from unflawed areas. By carrying out such inspection in substantial darkness, the location and extent of the flaws is readily revealed by the contrast ratio thereby afforded between the visible light-emitting flaw-indicating areas and the unflawed areas from which relatively no visible light or substantially less visible light is emitted or reflected. Due to the great sensitivity of the methods, the relative safety to the operators in the use of harmless near ultra-violet ranging from approximately 3500 A.U. to 4000 A.U., and the convenience and economy of producing such fluorescigenous energy, the above-described fluorescent flaw detecting methods now greatly predominate in the field of science of non-destructive testing over other methods, such as X-ray and ultrasonic methods. Due to the widespread commercial use of such fluorescent methods, numerous improvements in or relating to variations thereof have been adopted, such as, to mention a very few of the more predominant improvements in methods, materials, and apparatus, the improvements disclosed in the U.S. patents to R. A. Ward, U.S. Pat. No. 2,405,-078; T. de Forest, et al., U.S. Pat. Nos. 2,707,236, 2,806,-959, and 2,848,421; Joseph L. Switzer et al., U.S. Pat. Nos. 2,864,771 and 2,920,203; and Zenon Kazenas, U.S. Pat. No. 2,936,287.

It is to be noted that all the fluorescent methods as described in the above prior art rely upon visible light-emission of a fluorescent compound to reveal the location of a flaw to an operator. As the use of such methods has expanded to testing large volumes of parts in mass production or testing, as, for example, the testing of each individual turbine blade and bucket in gas turbine engines, such inspection by human operators has become a most serious production problem. The tediousness of the inspection and the unpleasantness of carrying out the inspection in darkened booths, the apparent humidity and closeness of the atmosphere even in well-ventilated inspection booths, fluorescent response of the human eyeball to near ultra-violet, and other disturbing effects are now estimated to have become the major factors causing error in such mass testing.

Various methods of eliminating the human factor in fluorescent testing methods by mechanical inspection equipment and techniques have been proposed, as, for example, by photographic techniques and/or by scanning the inspected article so that light emitted by the fluorescent indicating medium will cause a photoelectric eye to respond and mark, eject, or otherwise select the flawed piece for subsequent inspection by an operator. In other words, it has been proposed to employ some sort of automatic or semi-automatic means to separate definitely unflawed pieces from definitely flawed and/or suspicious pieces in order to reduce the volume of pieces subject to human inspection and to eliminate the tediousness involved in examining the normally large number of unflawed or acceptable parts as carefully as parts which are unacceptable. Unfortunately, such proposals to categorize acceptable, suspicious, and unacceptable parts have not yet been commercially practicable, in part due to the fact that such mechanical, i.e., electronic and/or photographic, means have not been perfected to the point where they can distinguish between definite flaw indications and mere background scum readily recognized by experienced operators. Primarily, however, it has been found that it is extremely difficult to exclude all leakage of visible light into the darkened inspection area from outside lighted areas in which other manufacturing and/or inspection operations are carried on. Because the quantity of visible light emitted by even a gross flaw indication is actually very minute, practically any amount of visible light leakage into the inspection area will actuate any mechanical scanning means, thereby voiding the effectiveness of the method and apparatus.

It has also been proposed, in connection with magnetic particle inspection methods, to use, as the tracer united with the magnetic core in such particles, a so-called "scintillating" agent. Such scintillating agents have the property of absorbing high-energy level invisible radiant energy and emitting, in response to excitation by such absorbed energy, radiant energy of a lower level and longer wavelength than the exciting energy but still of a shorter wavelength and higher energy level than visible light. The purpose and idea of using non-fluorescent scintillating agents in lieu of or in addition to fluorescent (visible-light emitting) tracers in magnetic particle inspection were as follows:

Whereas it is impractical in many commercial inspection installations to have normally ambient visible light so completely screened out from the inspection area that any scanning device would respond only to the very low amounts of visible light emitted by fluorescent flaw indication, any normal visible lighting for inspection areas will contain either none of the invisible radiations in the ranges of absorption and emission of scintillating agents or so little that it might be no particular problem to shield the scanning device responsive to such invisible energy from any that could be present in ambient visible lighting. Unfortunately, no practical operative scintillating magnetic powders have been found and, as far as is known, the various experimental programs to develop such non-destructive testing materials have been abandoned. The failures were attributable to one or more of the following possible causes: (a) The scintillating agents may be too inefficient as converters of the incident exciting energy to produce an emission exceeding the threshold responsiveness of available photo-electrical cells. (b) The sources of high-level energy, e.g., high-pressure mercury arc quartz tubes, also generally produce lower-level energy of the same longer wave lengths as those emitted by the scintillating agent; in such cases, the photo-electric cells or other scanning means would be incapable of distinguishing the energy emitted by the flaw indications and the energy reflected from the surface of the test body; available means for filtering the lower energy level radiations from the source of activating energy might also reduce the activating higher-level energy to ineffective amounts. (c) The photo-electric cells capable of responding to the emitted radiations of the scintillating agent may also respond to the activating incident energy which would also be reflected from the surface of the test body; in a given area scanned, the quantity of reflected activating energy will greatly exceed the quantities of emitted energy; thus, as a reciprocal of (b) above, available filters for the cells might not be sufficiently opaque to the reflected higher-level activating energy and transparent to the lower-level energy emitted by the flaw indications to enable the responsive cell to distinguish between the substantial amount of reflected energy and the possibly barely threshold quantities of emitted energy. (d) The preferable resins used to bond the scintillating agents to the magnetic cores or sub-particles in the scintillating magnetic particles might be so absorptive of the exciting energy and emitted energy or both so as to quench the scintillations below the threshold to which the photo-electric responsive devices are sensitive.

In analyzing the above causes or excuses for the failure of scintillating magnetic particles [which excuses also assume that it would, in fact, be possible to screen the scaning device from radiations in the emission range of the scintillating agents that could come from other sources sometimes present in actual commercial installations, such as direct sunlight, various mercury vapor industrial lighting systems, or adjacent manufacturing operations producing high intensity arcs or flames], it was noted that the preferable resins used to bond tracers to the magnetic cores or sub-particles in magnetic testing powders are generally aromatic organic compounds. It was further recognized that aliphatic organic compounds are generally more transparent to energies of the invisible wave lengths involved. Thus, the use of aliphatic, rather than aromatic, resinous binders in magnetic testing powders gave promise to eliminating one of the above-noted possible causes for their failure. However, further tests have now demonstrated that the binder used in previously tested powders was either not the cause of failure or contributed only insignificantly to it. Thus, as the state of the art appears at the present time, any operative scintillating magnetic powders useful for mechanical scanning of test parts by magnetic flux methods will appear to depend, if they are ever achieved, upon the development of more efficient scintillating agents or more sensitive and critical instrumentation, or both.

While it is clear from the foregoing that scin tillating agents, as such, are not equivalents of fluorescent agents as tracers in fluorescent methods of non-destructive testing, it has been discovered that scintillating agents may be used in lieu of or in addition to fluorescent agents in penetrant methods of non-destructive testing and the many heretofore only hoped-for advantages of mechanically scanning tested parts may, in fact, be obtained. It is not clearly apparent why scintillating agents are operative in one type of non-destructive testing medium, but not in another. One explanation is that the physical bulk of scintillating agents required to produce detectable response in magnetic testing powders reduces the magnetic permeability of the particles to substantially inoperative or unreliable levels, a physical property irrelevant to penetrant methods. Another is that the magnetic cores of magnetic testing powders are too powerful as absorbers of both the actuating and emitted wave lengths of the scintillating agent, whereas penetrant methods eliminate the presence of such absorbers in the testing medium.

Other and possibly less questionable explanations may be hereafter developed for the operativeness of this invention; in any event, it is the primary object and advantage of this invention to provide methods, means, and materials permitting the non-human scanning of parts provided with developments of flaw-indicating media by penetrant methods. The invention may be utilized for the direct selection of flawed and unflawed parts or for the pre-selection of such parts for later inspection by a human operator. Not only is it a great advantage to thereby eliminate a known cause of error, but the economy and savings in labor cost permit these non-destructive testing methods to be extended to the testing of individual mass-produced parts which heretofore were only spot or sample-tested, if tested at all.

Other objects and advantages will be apparent from the following general description of the invention, specific illustrative examples, the appended claims, and the attached drawing, in which apparatus as hereinafter described is shown schematically.

In general, this invention involves the use as the emitted indicating energy, of radiant energy in the Hertzian spectrum of a higher energy level, i.e., shorter wavelength, than is normally present in significant amounts in indoor illumination, natural or artificial. As the activating energy for such emitted non-visible energy, energy of still higher level is employed. Preferably the emitted light is in the so-called near-ultra-violet range, i.e., from about 3500 to 3600 A.U. at the higher energy level to approximately 4000 A.U. for the lower energy level of the emitted radiation. This encompasses the usual range of incident activating energy in fluorescent inspection methods which, by the definition of fluorescence, require the emission of visible light. The activating and exciting energy is preferable in the range of so-called intermediate ultra-violet ranging from approximately 3000 A.U. to 3500 A.U. and/or the so-called far ultra-violet, ranging from approximately 2200 A.U. to 3000 A.U. This invention does not exclude as activating energy that of still higher energy levels, such as long and short X-rays, or radioactive radiations of alpha, beta, and gamma rays, or the use, as emitted radiation, of a higher energy level than invisible near ultra-violet.

The inspection, i.e., detecting apparatus, in essence, comprises a conveyor for carrying test bodies past an activating energy source and a device responsive to emitted invisible energy. Means to scan the exposed area of the test body may constitute spindles for turning the test bodies, causing a beam of activating energy to scan the test bodies, and/or means to focus the responsive device on successive areas of the test bodies while the test bodies are continuously or intermittently conveyed through the test area.

As an illustrative source of activating energy successfully employed according to this invention, a beam of far ultra-violet generated by suitable source 1, such as a high-pressure mercury arc quartz lamp (General Electric Company lamp H85C3, employing a General Electric Company ballast 4009) was passed through a photoanalyzer 2 (Beckman spectrophotometer) equipped with a quartz prism to project a monochromated beam of 2200–2800 A.U. far ultra-violet. A test body having flaws to be indicated by a penetrant medium carrying a suitable scintillating compound, as described below, was placed in the path of said beam of monochromated far ultra-violet. A photo-electric cell 10 connected to a photomultiplier unit 11 was focused on said test body through a Woods filter 12 containing a nickel-cobalt glass passing near ultra-violet of 3300–4000 A.U. and caused to scan the surface of the test body. The response of the photo-electric cell to the emission of near ultra-violet in the range of 3650–3700 A.U. by the flaw-indicating medium on the test body was amplified to cause a galvanometer dial 13 to signal the response of the photo-electric cell to the near-ultra-violet emitted by the test piece. Manifestly, this response of the photo-electric cell as it responded when integers of scanned area included the scintillating test medium located at a flaw may be amplified further. By such further amplification the testing apparatus may usually through a suitable timer relay 14 actuate a solenoid piston 15 to move the defective part from, or at least onto another portion of the conveyor 16, to actuate a marking spray, or to operate another suitable means to sort or identify defective or questionable test bodies. Ordinary window glass coated with an ultra-violet absorbing lacquer as disclosed in Joseph L. Switzer et al. Patent, No. 2,653,109, was adequate to shield the testing area from any near ultra-violet which might be present in adjacent artificially illuminated areas and to exclude any far ultra-violet from escape into surrounding areas.

The scintillating agents may be incorporated in any suitable medium employable for fluorescent flaw detection methods, either in lieu of or in addition to the fluoragent used in such media. Selection of the particular scintillating agent depends upon whether the testing media calls for the agent in a solid or liquid form and the range of activating and emission energy for which the detecting apparatus is set up. Usually the scintillating agent is added to a fluoragent in the testing medium, since normally the detecting apparatus will sort questionable or unacceptable test bodies from a run of bodies to be tested, which sorted test bodies are then subjected to fluorescent inspection techniques for evaluation by a skilled operator. A specific example of scintillating material is crystalline naphthalene, a powderable agent having broad bands of absorption and emission of Hertzian wavelengths short of visible light. Preferred scintillating agents, however, are those which scintillate both in solution as well as in solid or crystalline form. Examples of such scintillating agents are paraterphenyl (emission peak at 3460 A.U.); 2.5 diphenyloxazole (emission peak at 3800 A.U.); phenylbiphenyl oxadiazole (emission peak 3700 A.U.); and alpha naphthylphenyl oxazole, a so-called wave shifter peaking at 4050 A.U. but usuable in conjunction with primary agents peaking at shorter wavelengths to shift the emission peak to longer wave lengths than that of the primary agent. Most such agents are relatively difficultly soluble in ordinary solvents but the technical specifications therefor usually disclose suitable solvents miscible with liquid vehicles or capable of being coupled in liquid vehicles. A suitable solvent for the above specifically named soluble scintillating agents is, for example, Flexol 3 GH (a trithylene glycol di(2 ethyl butyrate) plasticizer manufactured by Union Carbide and Chemical Co.).

In addition to organic scintillating agents, one may use inorganic agents in testing media permitting the use of solid agents, such as, for example, lead-activated barium silicate phosphors which strongly absorb necessary emission at the far ultra-violet frequency of 2537 A.U. and whose emission peak is at 3550 A.U.

The following are specific examples of testing media prepared for use according to this invention and are given by way of example and not by way of limitation:

EXAMPLE 1

A test piece is coated with a liquid penetrant containing no fluoragent or scintillating agents, as disclosed in De Forest Pat. No. 2,848,421. The penetrating liquid is removed from the surface without removal from the flaw openings into which it may have penetrated. As the penetrant liquid exudes from said flaw openings, it is dusted with a dry powder composed of an inert carrier, silica aerogel (30%), dry powdered paraterphenyl (40%), and a suitable dry powdered fluoragent, zinc hydroxy quinolinate (30%). The dry powder adheres to the exuding penetrant but is readily blown off unflawed areas of a flawed test piece or all the surface of an unflawed test piece. Passage of test bodies through a detecting apparatus as described above will enable the flawed and unflawed bodies to be sorted. The flawed pieces sorted out are thereafter inspected for evaluation of the fluorescent indication of the location and nature of the flaws and for acceptance of test bodies in which the flaw indications are false or locate the flaws in relatively insignificant unstressed areas.

EXAMPLE 2

A test piece is coated with a commercial water-washable liquid penetrant, such as disclosed in the Robert C. Switzer Pat. No. 2,953,530 (Example 1) but containing no fluoragent or scintillating agent. After allowing the coating to stand so as to penetrate any flaw openings present in the test piece, the penetrant liquid is washed with water to remove the liquid from the surface of the test piece, care being exercised to avoid washing the penetrant from flaw openings, if any, into which it may have penetrated. The test piece is then placed in an air-circulating oven maintained at 100° C. until any residual wash water has dried and penetrant liquid retained in the flaw openings has commenced to exude therefrom. The test piece is then removed from the oven and its entire surface is dusted with a powder consisting of dry powdered paraterphenyl. As in Example 1, the dry powdered paraterphenyl adheres to the penetrant exuded from the flaw opening but is otherwise blown off the test piece. After removing all of the unadhered dry powder, the piece is then passed through a detecting apparatus, as in Example 1, to detect the presence of flaws revealed by the invisible scintillations of the dry powdered paraterphenyl.

EXAMPLE 3

The test piece is coated with a commercial non-self-emulsifying or "post-emulsification" type of oily penetrant such as disclosed, for example, in the Taber De Forest et al. patent, No. 2,806,959 (Formulae 1 to 3). After the non-self-emulsifying penetrant has been drained to leave a film coating on the test piece, a coating of a suitable emulsifier for the penetrant is applied, such as, for example, an emulsifier as disclosed in Formulae 5 to 11 of the above De Forest et al. patent. The test piece is then washed and dried, leaving the surface of the test piece penetrant-free, except for residual penetrant at and around the flaw openings. Instead of applying an inert dry developer of finely powdered silica and talc, as disclosed in Formula 12 of the said De Forest patent, a dry powder consisting entirely of powdered paraterphenyl, as in Example 2, or a mixture of powdered terphenyl and an inert carrier, as in Example 1, is dusted on the test piece and then blown off to remove all such powder except that which is adhered at or adjacent the flaw openings by the oily penetrant. The test piece is then passed through the detecting apparatus as above described to detect the existence of the flaws by the invisible scintillations of the paraterphenyl, as in Examples 1 and 2. The presence or absence of a dye, fluorescent or non-fluorescent, dissolved in the penetrant or of a dry soluble or insoluble fluoragent or visible coloring material in the dusting powder otherwise containing or consisting of the scintillating agent, specifically paraterphenyl in this illustrative example, is a matter of choice, depending upon the extent to which inspection by an operator may be desired or practical after flawed and unflawed articles are sorted by use of the detecting apparatus as above described.

EXAMPLE 4

A solution of approximately one percent of paraterphenyl in Flexol 3 GH is prepared for use as a liquid penetrant, applied to a test piece, and allowed to stand for a period of time sufficient to permit the penetrant to enter the type of flaws likely to be present as a consequence of the prior processing or use of the test piece. This time may be as short as two or three minutes where gross flaws, such as large blow holes in rough castings, may be the type of flaws to be detected or as long as 45 minutes or an hour where fine fatigue cracks or grinding cracks are suspected. The penetrant is then mechanically removed from the surface as by wiping, sand-blasting, or the like. The piece is allowed to stand until the penetrant in the flaws and flaw openings exudes to the surface. The piece is then passed through the detecting apparatus as above described.

EXAMPLE 5

The procedure of Example 4 is followed except that a penetrant comprising a solution in triethylene glycol di(2-ethyl butyrate) of 2.5-diphenyloxazole (10% by weight), as the scintillating agent, is prepared and used as the penetrant.

EXAMPLE 6

The procedures of Examples 4 and 5 are followed except that the penetrants are coupled with oily penertant vehicles as disclosed in the Ward patent, No. 2,405,078. The concentration of the scintillating agent is adjusted, up to its maximum solubility in its solvent, to provide a penetrant in which the proportion of scintillating agent is sufficiently undiluted to provide an expense in the detecting apparatus. This proportion is usually in the order of 1% to 10%, depending upon the scintillating efficiency of the agent but may, of course, be decreased as more powerfully scintillating agents, alone or in combination, are developed.

In Examples 4 to 6, it is to be noted that the test pieces are simply held for a period of time after removal of the penetrant, other than that entrapped in the flaws and flaw openings, to permit such entrapped penetrant to exude to the cleaned surfaces of the test pieces. At least slightly better response of the detecting apparatus may be noted if, after cleaning off the non-entrapped penetrant, the surface is dusted with a dry developing powder as disclosed in U.S. patent to De Forest, No. 2,848,421. Or the said solution of scintillating agent may be coupled in equal portions in a liquid penetrant leaving a colloidal suspension or gel as a residue and as disclosed in the application of Joseph L. Switzer, Ser. No. 53,035, filed Aug. 31, 1960. The flaw indications are developed by the prescribed techniques and the test bodies are sorted in detecting apparatus as described above.

From the foregoing disclosure of this application, it should be apparent that this invention is not limited to the specific procedures, scintillating agents, or detecting apparatus disclosed, but may be modified by those skilled in the art within the scope of the appended claims.

What is claimed is:

1. A composition for detecting flaws in test bodies comprising a mixture of a dry carrier powder and a dry powdered scintillating agent, said carrier powder being chemically inert with respect to said scintillating agent and the bodies to be tested and physically unresponsive to energy activating said scintillating agent; said scintillating agent being characterized by its ability to emit radiant energy of a shorter wavelength and higher energy level than visible light upon excitation by still higher energy level, shorter wavelength radiant energy incident thereto, said carrier powder being more adherent to a wet surface than to a dry surface and both said dry carrier powder and said dry powdered scintillating agent being substantially non-adherent to a dry test body surface, whereby when said powdered mixture is distributed over a dry test body having exudation of a liquid penetrant from flaw openings therein, said mixture will adhere to said exudation but may be otherwise removed from the surface of said test body.

2. A composition for testing flaws in test bodies as defined in claim 1 in which said scintillating agent has an emission peak between 3460 A.U. and 3800 A.U.

3. A composition for testing flaws in test bodies as defined in claim 2 including a wave-shifter whose emission peak may be in the range of visible violet but which shifts the emission peaks of said scintillating agent to longer wavelengths less than visible light.

References Cited

UNITED STATES PATENTS

| | | | |
|---|---|---|---|
| 2,733,216 | 1/1956 | Eichholz et al. | 252—301.2 |
| 2,848,421 | 8/1958 | De Forest | 252—408 |
| 3,108,187 | 10/1963 | Thornbury | 250—71 |

HELEN M. McCARTHY, Primary Examiner

A. P. DEMERS, Assistant Examiner

U.S. Cl. X.R.
250—71; 252—301.3